(12) United States Patent
Takano

(10) Patent No.: US 7,627,045 B2
(45) Date of Patent: Dec. 1, 2009

(54) SYSTEM, METHOD, APPARATUS, AND COMPUTER PROGRAM FOR WIRELESS COMMUNICATION

(75) Inventor: Hiroaki Takano, Saitama (JP)

(73) Assignee: Sony Corporation, Tokyo (JP)

( * ) Notice: Subject to any disclaimer, the term of this patent is extended or adjusted under 35 U.S.C. 154(b) by 368 days.

(21) Appl. No.: 11/000,238

(22) Filed: Dec. 1, 2004

(65) Prior Publication Data

US 2005/0249303 A1 Nov. 10, 2005

(30) Foreign Application Priority Data

May 10, 2004 (JP) ............................. 2004-140488

(51) Int. Cl.
*H04K 1/10* (2006.01)
(52) U.S. Cl. .................................... 375/260
(58) Field of Classification Search ................. 375/134, 375/145, 149, 260, 267; 370/208, 210
See application file for complete search history.

(56) References Cited

U.S. PATENT DOCUMENTS

| | | | |
|---|---|---|---|
| 6,058,105 A * | 5/2000 | Hochwald et al. ........... 370/310 |
| 2004/0081073 A1 | 4/2004 | Walton et al. |
| 2004/0192218 A1* | 9/2004 | Oprea .......................... 455/73 |
| 2004/0219899 A1* | 11/2004 | Ho et al. ...................... 455/273 |
| 2005/0094741 A1* | 5/2005 | Kuroda ........................ 375/267 |
| 2005/0095996 A1* | 5/2005 | Takano ........................ 455/91 |
| 2005/0141631 A1* | 6/2005 | Takano ........................ 375/267 |
| 2005/0249151 A1* | 11/2005 | Takano ........................ 370/328 |
| 2006/0153062 A1* | 7/2006 | Tanabe et al. ............... 370/208 |

FOREIGN PATENT DOCUMENTS

| | | |
|---|---|---|
| JP | 10-084324 | 3/1998 |
| WO | WO 98/09381 | 3/1998 |
| WO | WO 02/082689 A2 | 10/2002 |

OTHER PUBLICATIONS

Yoshitaka Hara, et al., "Weight Control Scheme for MIMO System with Multiple Transmitter and Receiver Beamforming", Translated from Denshi Joho Tsushin Gakkai Ronbunshi, vol. J86-B, No. 12, Dec. 2003, pp. 2460-2474, Electronics and Communication in Japan, Part 1, vol. 88, No. 6, XP001227222, Jun. 2005, pp. 55-70.

(Continued)

*Primary Examiner*—Young T. Tse
(74) *Attorney, Agent, or Firm*—Oblon, Spivak, McClelland, Maier & Neustadt, P.C.

(57) ABSTRACT

The disclosed invention enhances transmission efficiency by decreasing regions of reference signals which are attached to transmit packets from a transmitter during bidirectional SVD-MIMO communication. The transmitter transmits user data following a reference signal. At the other end, the receiver acquires a channel matrix, based on the reference signal attached preceding the user data, receives the user data, while weighting the data with receive weights derived from the channel matrix, adaptively estimates the channel matrix H as long as the user data is being received, and obtains transmit weights V' for transmitting user data in the reverse direction from an adaptively estimated channel matrix H'.

5 Claims, 4 Drawing Sheets

OTHER PUBLICATIONS

International Standard ISO/IEC 8802-11:1999 (E) ANSI/IEEE Std 802.11, 1999 Edition, Part 11:Wireless LAN Medium Access Control (MAC) and Physical Layer (PHY) Specifications.

ETSI Standard ETSI TS 101761-1 V.1.2.1 Broadband Radio Access Networks (BRAN); HIPERLAN Type 2; Data Link Control (DLC) Layer; Part 1: Basic Data Transport Functions, (Nov. 2000).

ETSI TS 101761-2 V.1.1.1 Broadband Radio Access Networks (BRAN); HIPERLAN Type 2; Data Link Control (DLC) Layer; Part 2: Radio Link Control (RCL) sublayer, (Apr. 2000).

http://web.archive.org/web/20031024-re_/http://radio.3.cc.ucc.ac.jp/MIMO-IEICE-TB.pdf (as of Oct. 24, 2003), Yoshio Karasawa, "MIMO情報伝送の基礎" (with English Translation "Fundamentals of MIMO Information Transmissions").

* cited by examiner

F I G. 2
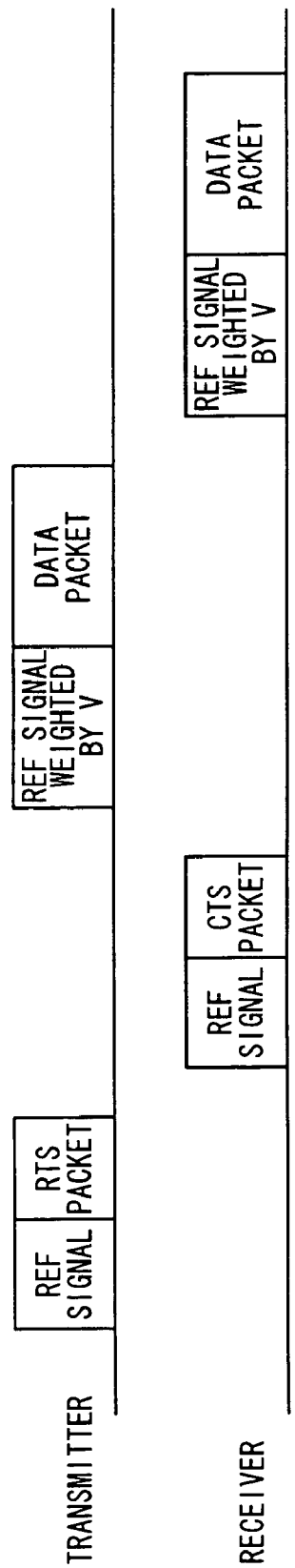
F I G. 3

F I G. 4
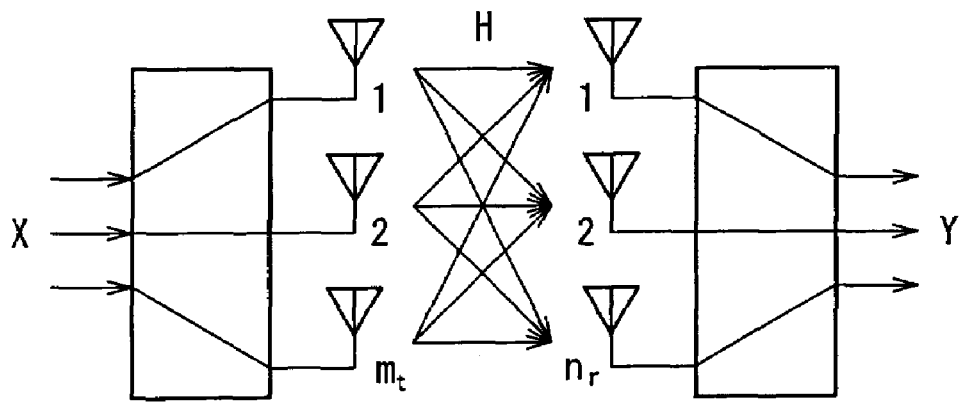
RELATED ART

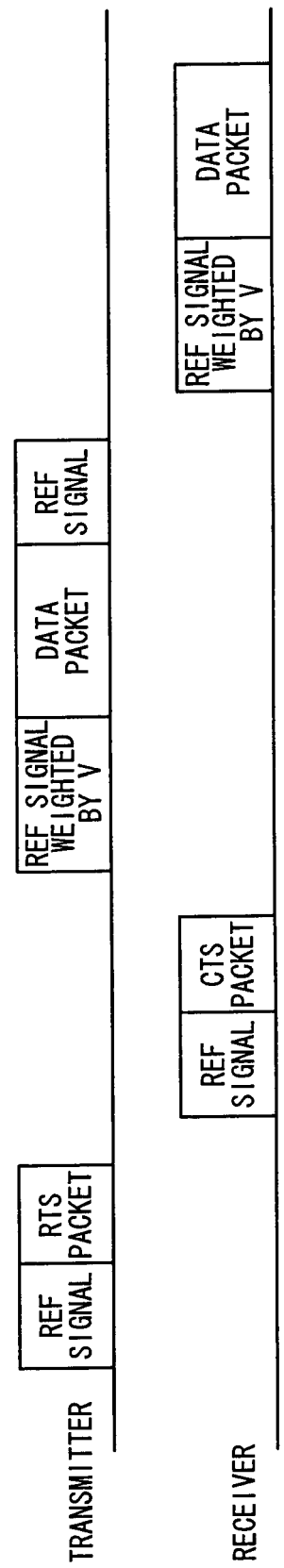

SYSTEM, METHOD, APPARATUS, AND COMPUTER PROGRAM FOR WIRELESS COMMUNICATION

CROSS REFERENCES TO RELATED APPLICATIONS

The present invention contains subject matter related to Japanese Patent Application JP 2004-140488 filed in the Japanese Patent Office on May 10, 2004, the entire contents of which being incorporated herein by reference.

BACKGROUND OF THE INVENTION

1. Field of the Invention

The present invention relates to a system, apparatus, method, and computer program for wireless communication to implement a wideband radio transmission between a plurality of wireless nodes or terminals, as typically performed in a wireless Local Area Network (LAN). In particular, this invention relates to such a system, apparatus, method, and computer program for wireless communication that enhance communication capacity by carrying out Multi Input Multi Output (MIMO) communication using multiple logical channels formed between a pair of a transmitter with multiple antennas and a receiver with multiple antennas by exploiting spatial multiplexing.

More specifically, this invention relates to such a system, apparatus, method, and computer program for wireless communication that carry out closed-loop MIMO transmission, using singular value decomposition (SVD) of a channel matrix with elements that are channels for pairs of transmit antennas and receive antennas, and, in particular, to the system, apparatus, method, and computer program for wireless communication that enhance transmission efficiency by decreasing regions of reference signals which are exchanged between a transmitter and a receiver for channel matrix acquisition during SVD-MIMO communication.

2. Description of Related Art

Sharing information resources and equipment resources can efficiently be implemented by computer networking typified by LAN. Now, wireless LANs draw attention as systems that free users from cable wiring in traditional wired LANs. Because the wireless LANs can dispense with most of wiring cables in working spaces such as offices, communication terminals such as personal computers (PCs) can be moved more easily.

Recently, because of enhanced speed and reduced price of wireless LANs, the demand for wireless LANs is increasing significantly. Particularly, introduction of a personal area network (PAN), that is, building of a small-scale wireless network with a plurality of electronic devices that are commonly used in living environments for information communication is being considered. According to Japanese Radio Regulations, different wireless communication systems and devices can be used in certain frequency bands, e.g. 2.4 GHz and 5 GHz bands, which are permitted for use without a license from the supervisory authority.

Typical standards for wireless networking include IEEE (the Institute of Electrical and Electronics Engineers) 802.11 (e.g., see non-patent document 1), HiperLAN/2 (e.g., see non-patent document 2 or non-patent document 3), IEEE 302.15.3, Bluetooth communication, etc. As for the IEEE 802.11 standard, there are also its enhanced versions IEEE 802.11a (e.g., see non-patent document 4), 802.11b, and 802.11g for different wireless communication systems and frequency bands employed.

The IEEE 802.11a standard supports a modulation scheme achieving a communication speed of up to 54 Mbps. However, there is a need for additional standards that can realize a higher bit rate of communication speed. For instance, IEEE 802.11n aims to develop a wireless LAN technology that allows for an effective throughput higher than 100 Mbps and to establish next-generation wireless LAN standards.

The MIMO communication attracts attention as one technology for realizing higher-speed wireless communication. The MIMO technology achieves enhancement in transmission capacity and communication speed, based on a MIMO system where both transmitter and receiver have multiple antenna elements, thus creating spatially multiplexed transmission channels (hereinafter referred to as "MIMO channels"). The MIMO communication makes an efficient use of a frequency band, because it exploits spatial multiplexing.

The MIMO communication scheme is such that separate transmit data streams are allocated to sub-carriers on the multiple antennas at the transmitter, the sub-carriers are transmitted over multiple virtual MIMO channels, and at the receiver, the sub-carriers received by its multiple antennas are processed and decoded into receive data. This communication scheme exploits channel characteristics, unlike simple adaptive antenna arrays at the transmitter and the receiver.

The MIMO communication system is conceptually depicted in FIG. 4. As shown here, both the transmitter and the receiver are equipped with multiple antennas. At the transmitter, multiple transmit data streams are space-time coded, multiplexed, and allocated to the sub-carriers on M antennas, and the sub-carriers transmitted over multiple MIMO channels. At the receiver, the sub-carriers received by N antennas via the channels are space-time decoded into receive data. This channel model consists of a radio environment (transfer function) around the transmitter, a channel space structure (transfer function), and a radio environment around the receiver (transfer function). Although crosstalk takes place when a transmit signal is multiplexed into sub-carriers and the sub-carriers are transmitted from the transmit antennas, the received multiplexed sub-carriers can be separated into respective proper data streams without crosstalk through signal processing at the receiver.

While various schemes of MIMO transmission configuration have been proposed, it is a significant problem in implementation how to communicate channel information between the transmitter and the receiver, according to the configuration of the antennas.

To communicate channel information, a method of transmitting known information (preamble information) only from the transmitter to the receiver is easy. In this case, the transmitter and the receiver perform spatial multiplexing transmission independently from each other; this is called an open-loop MIMO transmission scheme. An evolved style of this method is a closed-loop MIMO transmission scheme in which ideal, spatially orthogonal channels are created by feedback of preamble information from the receiver to the transmitter as well.

An example of the open-loop MIMO transmission scheme is a Vertical Bell Laboratories Layered Space Time (V-BLAST) scheme (e.g., see patent document 1). The transmitter simply multiplexes a signal into sub-carriers on each transmit antenna and transmits the sub-carriers without assigning a matrix of antenna weighting factors to the sub-carriers. In other words, a procedure of feedback for acquiring the matrix of antenna weighting factors is dispensed with. The transmitter inserts a training signal that is used for channel estimation into the data stream on each antenna, e.g., in a time division manner, before transmitting multiplexed sub-carriers. On the other hand, at the receiver, a channel estimation section performs channel estimation, using the training signal, and calculates a channel information matrix H for every antenna pair. By way of combining zero-forcing and cancellation neatly, the receive signal SN ratio is enhanced taking advantage of spatial degrees of freedom offered by the antennas resulting from the cancellation and decoding probability is increased.

As an ideal form of the closed-loop MIMO transmission, an SVD-MIMO scheme using the SVD of a propagation path function is known (e.g., see non-patent document 5).

An SVD-MIMO transmission system is conceptually depicted in FIG. 5. In the SVD-MIMO transmission, $UDV^H$ is obtained by singular value decomposition of a numeric matrix with elements of channel information per antenna pair, namely, a channel information matrix H. V as a matrix of antenna weighting factors at the transmitter is assigned to sub-carriers on transmit antennas and $U^H$ as a matrix of antenna weighting factors at the receiver is assigned to the sub-carriers received by receive antennas. Consequently, the MIMO channels are represented as a diagonal matrix D with diagonal elements that are square roots of eigenvalues $\lambda_i$ per channel, and the multiplexed sub-carriers of a signal can be transmitted without suffering from crosstalk at all. In this case, on both transmit and receive sides, logically independent multiple channels formed by space division, or exactly, spatially orthogonal multiplexing can be realized.

By the SVD-MIMO transmission scheme, it is possible to achieve maximum communication capacity in theory; for instance, if the transmitter and the receiver each have two antennas, the transmission capacity will be doubled at maximum.

The mechanism of the SVD-MIMO transmission scheme is now to be discussed in detail. If the transmitter has M antennas, transmit signal x is represented as a set of M×1 vectors; if the receiver has N antennas, receive signal y is represented as a set of M×1 vectors. In this case, channel characteristics are represented as a numeric matrix of N×M, namely, channel matrix H. An element $h_{ij}$ of the channel matrix H corresponds to a transfer function from the j-th transmit antenna to the i-th receive antenna. Receive signal vector y is obtained by multiplying the channel information matrix by the transmit signal vector and adding noise vector n to the product, as expressed in the following equation (1).

$$y = Hx + n \quad (1)$$

The above-mentioned singular value decomposition of the channel information matrix H is expressed by the following equation (2).

$$H = UDV^H \quad (2)$$

Here, the matrix V of antenna weighting factors at the transmitter and antenna weight matrix U at the receiver are unitary matrices fulfilling the following equations (3) and (4), respectively.

$$U^H U = I \quad (3)$$

$$V^H V = I \quad (4)$$

Specifically, a set of normalized eigenvectors of $HH^H$ corresponds to the antenna weight matrix $U^H$ at the receiver and a set of normalized eigenvectors of $H^H H$ corresponds to the antenna weight matrix V at the transmitter. D is a diagonal matrix with diagonal elements that are square roots of eigenvalues $\lambda_i$ of $H^H H$ or $HH^H$. The matrix size is determined by the number of transmit antennas M or the number of receive antennas N, whichever is smaller; that is, a square matrix of size of min (M, N) is obtained and the diagonal matrix is obtained from the square matrix.

$$D = \begin{bmatrix} \sqrt{\lambda_1} & \cdots & & 0 \\ \vdots & \sqrt{\lambda_2} & & \\ & & \ddots & \\ 0 & & & \sqrt{\lambda_{min(M,N)}} \end{bmatrix} \quad (5)$$

Although singular value decomposition for real numbers has been discussed above, care should be taken for singular value decomposition extension up to imaginary numbers. Although U and V are matrices consisting of eigenvectors, eigenvectors with different phases, which are not singular, exist in countless numbers, even if the eigenvectors are manipulated so that a norm of 1 is obtained, in short, they are normalized. In some phasic relationships between U and V, the above equation (2) is dissatisfied, because the phases of U and V are angled differently, though both the U and V are valid. For complete phase matching, V is obtained normally as a set of eigenvectors of $H^H H$. However, U is obtained by multiplying the both sides of the above equation (2) by V, as expressed in the following equation.

$$HV = UDV^H V = UDI = UD \quad (6)$$

$$U = HVD^{-1}$$

The transmitter transmits sub-carriers weighted by the matrix V of transmit antenna weighting factors and the receiver receives the sub-carriers that are then weighted by the matrix $U^H$ of receive antenna weighting factors. This is expressed by the following equation, where U is N×min (M,N) and V is M×min (M, N), as U and V are unitary matrices.

$$\begin{aligned} y &= U^H HVx + U^H n \quad (7)\\ &= U^H (UDV^H)Vx + U^H n \\ &= (U^H U)D(V^H V)x + U^H n \\ &= IDIx + U^H n \\ y &= Dx + U^H n \end{aligned}$$

Here, receive signal y and transmit signal x have (min (M, N)×1) vectors, not determined by the number of transmit antennas and the number of receive antennas.

Because D is the diagonal matrix, the transmit signal sub-carriers can be received without crosstalk. Since the amplitude of each of the independent MIMO channels is proportional to the square root of the eigenvalue $\lambda$ for the channel, the power of each MIMO channel is proportional to $\lambda$.

Since the noise component n is also an eigenvector normalized to a norm of 1 in the U column, $U^H n$ does not affect the noise power. The size of $U^H n$ is a set of (min (M, N)) vectors, which is the same as the size of y and x.

In the SVD-MIMO transmission, in this way, logically independent multiple MIMO channels free of crosstalk can be available simultaneously in a same frequency band. Thus, using the same frequency band, multiple data streams can be transmitted simultaneously by wireless communication, and enhanced transmission speed can be achieved.

The number of MIMO channels available in the SVD-MIMO communication system matches the number of transmit antennas M or the number of receive antennas N, whichever is smaller, min [M, n]. The matrix V of transmit antenna weighting factors consists of transmit vectors $v_i$ as many as the number of MIMO channels ($V=[v_1, v_2, \ldots v_{min[M, N]}]$). The elements of the transmit vectors $v_i$ are as many as the number of transmit antennas M.

Generally, in the closed-loop MIMO scheme typified by SVD-MIMO, the transmitter is capable of calculating optimum weight factors for its antennas, based on information for the propagation paths. Furthermore, it is known that, by selecting an optimal coding ratio and a modulation scheme to be applied to bit streams on transmit antenna chains, more ideal information transmission can be realized.

However, practical operation of a system of the closed-loop MIMO scheme encounters such a problem that, if the conditions of the channels vary to a great extent, as the transmitter and the receiver move, feedback from the receiver to the transmitter must occur more frequently. In the SVD-MIMO communication scheme, it is not easy to calculate the singular value decomposition in real time. In addition, it is necessary to perform a setup procedure for advanced notification of V or $U^H$ obtained by the SVD calculation to the other end of communication.

By way of example, for an Orthogonal Frequency Division Multiplexing (OFDM) communication system of IEEE 802.11a, namely, in a 5 GHz band, one LAN system to which the SVD-MIMO transmission is applied, let us consider how much will be the information of the matrix V of transmit antenna factors. Given that three transmit antenna elements and three receive antenna elements are employed, the matrix V of transmit antenna factors is 3×3, having nine elements. If one element is assumed to consist of a real number and a complex number which are accurate to 10 bits and the matrices V for 52 carriers are required, 9,360 bits (=9 (elements of the matrix)×2 (the real part and imaginary part of a complex number)×10 (bits)×52 (OFDM sub-carriers) must be fed back from the receiver to the transmitter.

A point that must be considered when constructing an actual SVD-MIMO transmission/reception system is now discussed.

In the basic form of the SVD-MIMO transmission scheme, at the receiver, by the singular value decomposition for the acquired channel matrix H, a set of receive weight vectors $U^H$ and a set of transmit weight vectors V that are employed at the transmitter are obtained, and this set of the vectors V is fed back to the transmitter. At the transmitter, this set of the vectors V is used as the set of the weights for transmission.

However, in the event that the amount of transmit weight matrix V information to be fed back to the transmitter is so large and sparsified V information is transmitted back, the orthogonal state of the MIMO channels will be altered due to errors from true V information and crosstalk will occur.

In view hereof, after the receiver feeds back the transmit weight matrix V to the transmitter, usually, the transmitter transmits a reference signal weighted with the matrix V to the receiver and the receiver acquires the channel matrix again. Given that the channel matrix is H, the receiver can acquire a channel matrix HV from the reference signal weighted by V.

At the receiver, an inverse matrix of the HV is obtained and used as a set of weights for reception. Since $H=UDV^H$, HV and its inverse will be obtained, as expressed in the equation below:

$$HV = UDV^H V \quad (8)$$
$$= UD$$
$$(HV)^- = (UD)^- = D^- U^- = D^- U^H$$

This is such that, after received sub-carriers are weighted with $U^H$ in the same manner as in normal SVD-MIMO, the separated streams for the MIMO channels are merely multiplied, respectively, by constants that are derived from the diagonal elements $\lambda_i$ of the diagonal matrix D.

Arrangement in which the matrix V is used as a set of weights for transmission at the transmitter and the inverse matrix of HV is used as a set of weights for reception at the receiver is the same as performance of normal SVD-MIMO, and V mismatch at the transmitter and the receiver does not occur. Therefore, this arrangement can be used practically.

[Patent document 1] JP-A No. H10-84324

[Non-patent document 1] International Standard ISO/IEC 8802-11:1999 (E) ANSI/IEEE Std 802.11, 1999 Edition, Part 11: Wireless LAN Medium Access Control (MAC) and Physical Layer (PHY) Specifications

[Non-patent document 2] ETSI TS 101 761-1 V.1.2.1 (2000-11) Broadband Radio Access Networks (BRAN); HIIPERLAN Type 2; Data Link Control (DLC) Layer; Part 1: Basic Data Transport Functions

[Non-patent document 3] ETSJ TS 101 761-2 V1.1.1 (2000-04) Broadband Radio Access Networks (BRAN); HIIPERLAN Type 2; Data Link Control (DLC) Layer; Part 2: Radio Link Control (RLC) sublayer

[Non-patent document 4] Supplement to IEEE Standard for Information Technology—Telecommunications and information exchange between systems—Local and metropolitan area networks—Specific requirements—Part 11: Wireless LN Medium Access Control (MAC) and Physical Layer (PHY) specifications: High-speed Physical Layer in the 5 GHz Band

[Non-patent document 5] http://web.archive.org/web/2003 1024-re /httD ://radio3.ee.uec.ac.ip/MIMO-IEJCE-TB .pdf (as of Oct. 24, 2003)

To carry out SVD-MIMO communication, it is necessary to acquire the channel matrix or the like. Meanwhile, in typical wireless communication systems, the CSMA/CA scheme is applied for collision avoidance, and at the same time, the so-called RTS/CTS procedure is performed to get a transmission right for the purpose of, for instance, solving a hiding terminal problem. Therefore, channel matrix acquisition can be performed by using packets such as RTS, CTS, DATA, and ACK and through a control procedure that will be described below (see FIG. 6). Hereinafter, for convenience, the downlink from the transmitter to the receiver is referred to as the forward direction and the uplink from the receiver to the transmitter is referred to as the reverse direction.

(Step 1)

The transmitter transmits an RTS packet to the receiver. A reference signal is attached to the RTS packet.

(Step 2)

At the receiver, a channel matrix H is acquired from the RTS packet received.

(Step 3)

At the receiver, from the acquired channel matrix H, it is determined what modulation scheme is employed and how many independent spatial channels are available.

Upon receiving the RTS, the receiver may have requirement to determine a modulation scheme to be employed. For instance, the receiver may want to stop transmission from nodes or terminals in its vicinity until the completion of ACK, using a NAV which should be attached to CTS. For Short NAV setting, it is necessary to perceive the modulation scheme employed for the channel and the bit rate on the channel. To determine what modulation scheme should be used at the transmitter for transmission, it is necessary to know the conditions of the MIMO channels, namely, eigenvalues $\lambda_i$ per channel, derived by singular value decomposition of the matrix H, so that what condition of the channel matrix H will be perceived.

(Step 4)

The receiver returns a CTS to the transmitter. To the CTS, a reference signal for channel matrix estimation is attached.

(Step 5)

At the transmitter, from the reference signal attached to the CTS transmitted from the receiver, a channel matrix H in the reverse direction is acquired.

If calibration is performed to compensate for difference in the characteristics of the analog circuits in the antenna chains of the transmitter and difference in the characteristics of the analog circuits in the antenna chains of the receiver, the transfer functions in the forward and reverse directions will be the same. A method for calibrating the difference in the characteristics of the analog circuit portions at the transmitter and the receiver is described, e.g., in JP-B (Japanese Examined Patent Application Publication) whose patent right has already been assigned to the present inventors.

(Step 6)

The transmitter executes singular value decomposition of the acquired matrix H in the reverse direction and determines the weights V for transmission in the forward direction of course, the weights for transmission in the forward direction, obtained by singular value decomposition at the receiver, may be fed back to the transmitter; however, its information amount is excessively large. Therefore, the receiver transmits back the reference signal having a small quantity of data and the transmitter acquires V as above.

(Step 7)

In response to the reception of the CTS signal from the receiver, the transmitter transmits a data packet. To the beginning of this data packet, a reference signal weighted by V is attached, followed by user data (payload). Furthermore, following the user data, a reference signal not weighted by V is transmitted.

(Step 8)

At the receiver, a channel matrix HV is acquired from the reference signal weighted by V, its inverse matrix (see equation (8)) is obtained as a set of weights for reception, and thereby weighted user data is received. Also, the receiver can acquire a new H' from the reference signal following the user data.

(Step 9)

At the receiver, by singular value decomposition of the new H' acquired, transmit weights V' in the reverse direction for user data that is transmitted from the receiver to the transmitter are obtained.

(Step 10)

The receiver transmits a reference signal weighted by new transmit weights V', followed by user data; thus, it performs data communication in the reverse direction, or on the uplink.

(Step 11)

The transmitter acquires a channel matrix H'V' from the reference signal weighted by V', its inverse matrix is obtained as weights for reception, and thereby weighted user data is received.

Through the procedure above, it is possible to carry out bidirectional MIMO communication of RTS, CTS, DATA (downlink), and DATA (uplink).

In communication systems that carry out weighted transmission and reception based on a channel matrix H obtained from the conditions of the transmission paths, channel matrix change over time presents problems. The channel matrix is liable to change momentarily, e.g., due to change in reflected paths caused by movement of a mobile terminal that uses the channel and its user in an indoor environment. It is thus necessary to use a most recent channel matrix immediately before initiating data transmission.

However, in the above communication procedure, the transmitter needs to transmit a reference signal not weighted by V following user data in step 7 to allow acquisition of transmit weights in the reverse direction at the receiver (see FIG. 6). This poses a problem in which adding an extra reference signal to user data decreases transmission efficiency.

SUMMARY OF THE INVENTION

The present invention addresses the above-described technical problems and its primary object is to provide a superior system, method, apparatus, and computer system for wireless communication that are able to enhance transmission capacity by carrying out MIMO communication using multiple logical channels formed by exploiting spatial multiplexing.

It is another object of this invention to provide a superior system, method, apparatus, and computer system for wireless communication that are able to carry out closed-loop MIMO transmission with improved transmission efficiency, using the singular value decomposition of a channel information matrix H with elements that are channels for pairs of transmit antennas and receive antennas.

It is a further object of this invention to provide a superior system, method, apparatus, and computer system for wireless communication that are able to enhance transmission efficiency by decreasing regions of reference signals which are exchanged between a transmitter and a receiver for channel matrix acquisition during SVD-MIMO communication.

It is a still further object of this invention to provide a superior system, method, apparatus, and computer system for wireless communication that are able to enhance transmission efficiency by decreasing regions of reference signals which are attached to transmit packets from a transmitter during bidirectional SVD-MIMO communication.

A first aspect of the present invention, which has been contemplated to address the foregoing objects, resides in a wireless communication system which carries out data transmission, using multiple spatially multiplexed communication channels between a transmitter and a receiver, wherein the transmitter transmits user data following a reference signal for channel matrix acquisition and the receiver acquires a channel matrix, based on the reference signal attached preceding the user data, receives the user data; while weighting the data with receive weights derived from the channel matrix, and adaptively estimates the channel matrix H as long as receiving the user data is being received.

The "system" as used herein is a complex in which a plurality of devices (or functional modules for implementing specific functions) joined logically and it is no matter whether or not each device or functional module does not present in a single chassis.

The wireless communication system of the present invention uses, e.g., the MIMO communication scheme and is able to increase transmission capacity and enhance communication speed, using spatially multiplexed transmission paths, namely, MIMO channels. In this case, both the transmitter and the receiver are equipped with multiple antennas, the transmitter allocates transmit data to multiple streams and transmits weighted streams from the transmit antennas and the receiver weights the streams received by the receive antennas.

In the wireless communication system of the present invention, the closed-loop communication scheme typified by SVD-MIMO transmission can be used. In this case, the transmitter acquires optimal transmit antenna weighting factors, based on feedback information from the receiver.

In a typical wireless communication system, nodes or terminals perform the RTS/CTS procedure to get a transmission right, while performing access control based on the CSMA/CA. In this case, to carry out SVD-MIMO communication, a reference signal for channel matrix acquisition is attached to each packet of RTS, CTS, and DATA.

However, for data transmission on the uplink from the receiver to the transmitter, or in the reverse direction, following data transmission on the downlink from the transmitter to the receiver, or in the forward direction, according to the RTS/CTS procedure, the transmitter must transmit a reference signal not weighted by V following user data to allow the receiver to acquire transmit weights in the reverse direction. This poses a problem in which adding an extra reference signal to user data decreases transmission efficiency.

In view hereof, the present invention provides a method that dispenses with a reference signal following user data transmitted from the transmitter to the receiver.

The transmitter transmits a reference signal for channel matrix acquisition at the receiver and user data following the reference signal. On the other hand, the receiver acquires a channel matrix, based on the reference signal attached preceding the user data, receives the user data, while weighting the data with receive weights derived from the channel matrix, adaptively estimates the channel matrix H as long as the user data is being received, and obtains transmit weights V' for transmitting user data on the uplink, or in the reverse direction, from an adaptively estimated channel matrix H'.

Hereinafter, user data from the transmitter to the receiver is referred to as downlink data. User data from the receiver to the transmitter is referred to as uplink data. A channel matrix for the channels from the transmitter to the receiver is denoted by H(Dn) and a channel matrix for the channels from the receiver to the transmitter is denoted by H(Up).

Downlink data is weighted by V at the transmitter. At the receiver, using H(Dn)V derived from the reference signal weighted by transmit weights V in the forward direction, user data can be demultiplexed into multiple spatial channels and received. Difference between this received data and signal points in signal space is obtained as error information, and using an algorithm such as LMS, an estimate value of the channel matrix H(Dn)V can be updated. Thus, even if H(Dn)V has changed to H(Dn, new)V with time, it is possible to follow this change if the change is gradual. Following change in the channel condition by adaptive estimation of the channel matrix is well known to those skilled in the art.

That is, by following H(Dn)V by using decision feedback, change of the channel matrix to H(Dn, new)V can be detected at the receiver.

Meanwhile, weights for transmitting uplink data in the reverse direction from the receiver to the transmitter must be obtained newly.

An uplink channel matrix H(Up) can be represented as a transposed matrix of a downlink channel matrix H(Dn) as shown in the following equation, where $A^T$ is a transposed matrix of matrix A, $A^*$ is a complex conjugate matrix of matrix A, and $A^H$ is a conjugate transposed matrix of matrix A.

$$H(Up) = H(Dn)^T \quad (9)$$

The above equation (9) is evaluated as follows.

$$H(Up) = H(Dn)^T = (U(Dn)D(Dn)V(Dn)^H)^T \quad (10)$$
$$= V(Dn)^* D(Dn) U(Dn)^T$$

Thus, $(U(Dn)^H)^T = U(Dn)^*$ can be used as the weights for transmitting uplink data.

Now, if H(Dn, new)V immediately before transmitting uplink data can be acquired, the transmit weights U(Dn) when transmitting the uplink data can be obtained.

As long as downlink data from the transmitter is being received, the receiver follows change to the H(Dn)V channel information by adaptive estimation; therefore, the receiver can acquire H(Dn, new)V.

The transmit weights V(Dn) used for downlink data transmission from the transmitter are still old V(Dn) which are held at the receiver.

After the receiver derives H(Dn)V from the reference signal weighted by V attached to the beginning of downlink data from the transmitter, it can follow channel condition change by obtaining a most recent channel matrix through adaptive estimation. When transmitting uplink data, the receiver can obtain the most recent channel matrix H(Dn, new) on the downlink, or in the forward direction, by multiplying H(Dn, new)V by $V^H$ (H(Dn, new)$VV^H$). Since the channel matrix on the uplink, or in the reverse direction, is a transposed matrix of the downlink channel matrix, by singular value decomposition of H(Dn, new)$^T$, the transmit weights U(Dn)* for transmitting uplink data can be obtained.

According to the method of calculating the transmit weights for transmitting uplink data as above, it becomes unnecessary to transmit a reference signal following downlink data as shown in FIG. 6.

A second aspect of the present invention resides in a computer program coded in a computer readable form to perform a process on a computer system for receiving data transmitted from a transmitting end, using multiple spatially multiplexed communication channels, wherein the computer program comprises the following steps: acquiring a channel matrix in the forward direction from the transmitting end; adaptively estimating the channel matrix H as long as receiving user data transmitted in the forward direction from the transmitting end while weighting the data with receive weights derived from the acquired channel matrix; and determining transmit weights for transmitting user data in the reverse direction to the transmitting end, based on the adaptively estimated channel matrix.

The computer program according to the second aspect of the present invention is defined as the program coded in a computer readable form to implement predetermined processing on a computer system. In other words, when copies of the computer program are installed in individual computer systems, they work cooperatively across the computer systems and cause the systems to operate as communication devices. Building a network where a plurality of such communication devices are set up can produce the same effect as the first aspect of the present invention.

The present invention can provide a superior system, method, apparatus, and computer system for wireless communication that are able to carry out closed-loop MIMO transmission efficiently, using the singular value decomposition of a channel information matrix H with elements that are channels for pairs of transmit antennas and receive antennas.

Also, this invention can provide a superior system, method, apparatus, and computer system for wireless communication that are able to enhance transmission efficiency by decreasing regions of reference signals which are exchanged between a transmitter and a receiver for channel matrix acquisition during SVD-MIMO communication.

Moreover, this invention can provide a superior system, method, apparatus, and computer system for wireless communication that are able to enhance transmission efficiency by decreasing regions of reference signals which are attached to transmit packets from a transmitter during bidirectional SVD-MIMO communication.

Further objects, features, and advantages of the present invention will become apparent from the following detailed description of an illustrative embodiment of the invention based on the accompanying drawings.

BRIEF DESCRIPTION OF THE DRAWINGS

FIG. 2 is a diagram that schematically depicts the functional structure of a channel characteristics acquisition and adaptive estimation unit;

FIG. 3 is a diagram to explain bidirectional MIMO communication according to the RTS/CTS procedure;

FIG. 4 is a diagram that conceptually depicts a MIMO communication system;

FIG. 6 is a diagram to explain bidirectional MIMO communication according to the RTS/CTS procedure.

DETAILED DESCRIPTION OF THE PREFERRED EMBODIMENTS

An illustrative embodiment of the present invention will be described fully hereinafter with reference to the accompanying drawings.

This invention relates to a MIMO communication system where spatial signal multiplexing communication is performed between a pair of a transmitter with multiple antennas and a receiver with multiple antennas.

In a typical wireless communication system, nodes or terminals perform the RTS/CTS procedure to get a transmission right, while performing access control based on the CSMA/CA. In this case, to carry out SVD-MIMO communication, a reference signal for channel matrix acquisition is attached to each packet of RTS, CTS, and DATA.

For data transmission on the uplink from the receiver to the transmitter, or in the reverse direction, following data transmission on the downlink from the transmitter to the receiver, or in the forward direction, according to the RTS/CTS procedure, the receiver must acquire transmit weights in the reverse direction.

To allow the receiver to acquire transmit weights in the reverse direction, the transmitter transmits a reference signal not weighted by V following user data, which decreases transmission efficiency, as an extra reference signal is attached to user data.

In the present invention, the transmitter transmits a reference signal for channel matrix acquisition at the receiver and user data following the reference signal. On the other hand, the receiver acquires a channel matrix, based on the reference signal attached preceding the user data, receives the user data, while weighting the data with receive weights derived from the channel matrix, and adaptively estimates the channel matrix H as long as the user data is being received. From an adaptively estimated channel matrix H', the receiver can obtain transmit weights V' for transmitting user data on the uplink, or in the reverse direction. Consequently, it becomes unnecessary to attach a reference signal following the user data to be transmitted from the transmitter to the receiver, improving transmission efficiency.

Figure 1:
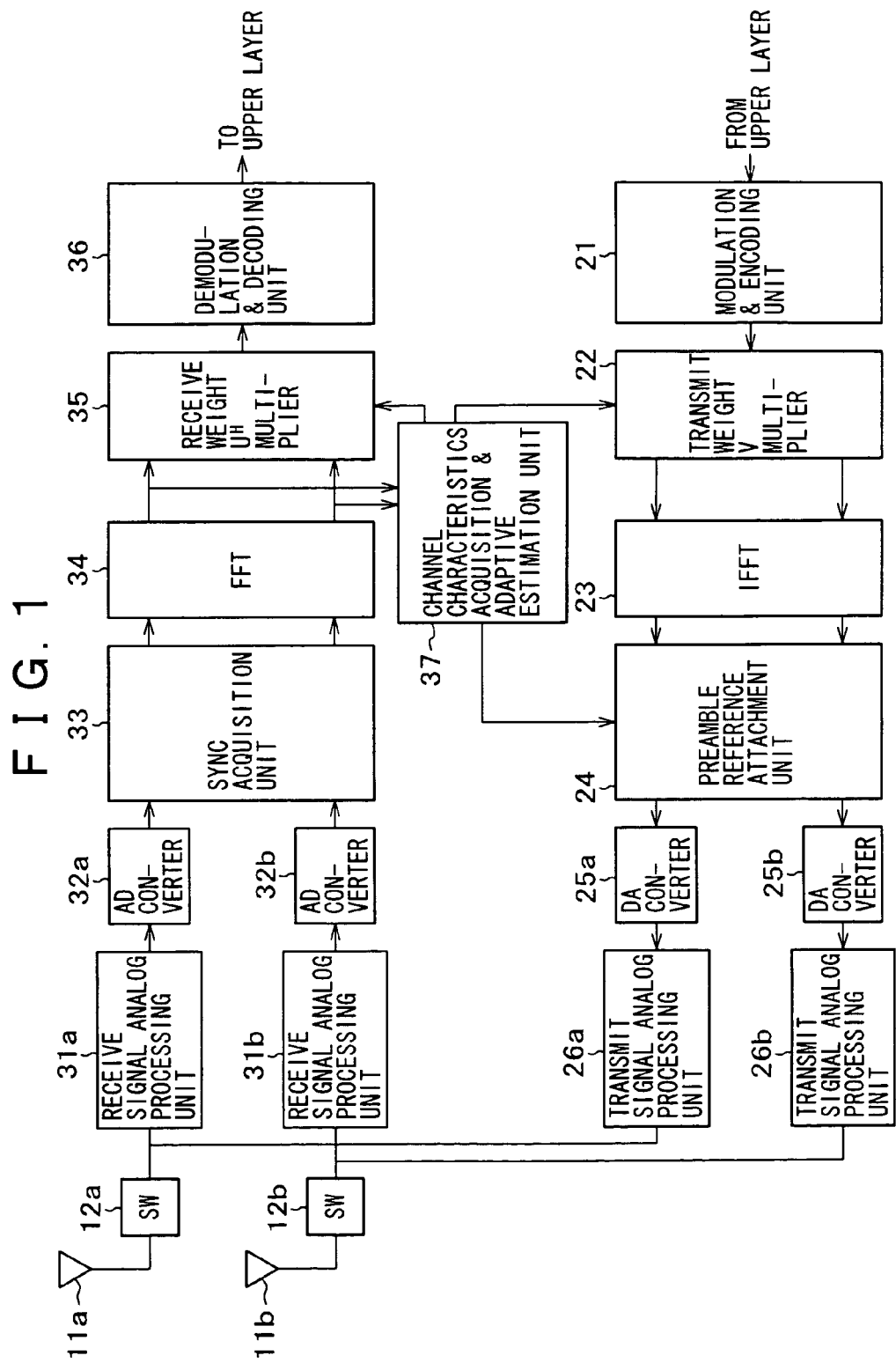
FIG. 1 is a diagram showing the configuration of a wireless communication apparatus according to an embodiment of the present invention.
Figure 5:
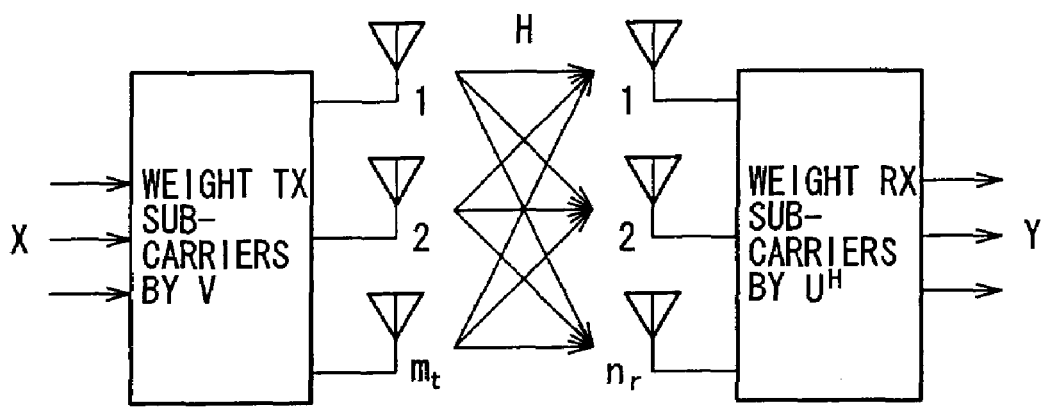
FIG. 5 is a diagram that conceptually depicts an SVD-MIMO transmission system.

FIG. 1 shows the configuration of a wireless communication apparatus according to an embodiment of the present invention.

The wireless communication apparatus shown in FIG. 1 is equipped with two transmit/receive antennas 11a and 11b and capable of data transmission in accordance with the SVD-MIMO scheme. That is, for transmission, a transmit signal is multiplexed into sub-carriers, after the sub-carriers are assigned transmit antenna weighting factors, they are space-time coded and allocated to the two antennas 11a and 11b from which they are transmitted onto respective channels. For reception, the multiplexed sub-carries received by the two antennas 11a and 11b via the respective channels are assigned receive antenna weighting factors and space-time decoded into receive data. However, the gist of the present invention is not limited to two antennas and three or more antennas may be employed.

Transmission chains and reception chains are connected in parallel to the two transmit/receive antennas 11a and 11b via switches 12a and 12b for wireless transmission of signals over a predetermined frequency channel to any other wireless communication apparatus or reception of signals transmitted from any other wireless communication apparatus. However, the switches 12a and 12b make connection to either a transmission chain or a reception chain exclusively at a time and each antenna is unable to perform concurrent transmission and reception.

Each transmission chain comprises a modulation and encoding unit 21, a transmit weight multiplier 22, IFFT 23, a preamble/reference attachment unit 24, a D/A converter 25, and a transmit signal analog processing unit 26.

The modulation and encoding unit 21 encodes transmit data sent from an upper layer of a communication protocol by error correction coding and map transmit signals in a signal space, using a predetermined modulation scheme such as BPSK, QPSK, and 16 QAM. At this time, a known data string may be inserted as a pilot symbol into a modulated symbol sequence, according to pilot symbol insertion pattern and timing. One pilot signal consisting of a known pattern may be inserted for every sub-carrier or for every several sub-carriers.

The transmit weight multiplier 22 multiplies encoded transmit signals by a transmit weight matrix V, which creates multiple MIMO channels by spatial multiplexing.

The transmit weight matrix V is created based on feedback information from the other end of communication, and set in the transmit weight multiplier 22. Alternatively, for data transmission on the uplink from the receiver to the transmitter, or in the reverse direction, following data transmission on the downlink from the transmitter to the receiver, or in the forward direction, according to the RTS/CTS procedure, transmit weights V' in the reverse direction can be obtained, based on the result of adaptive estimation of the channel matrix H, executed by a channel characteristics acquisition and adaptive estimation unit 37 during user data reception. The procedure for obtaining transmit weights V' in the reverse direction will be described later.

The IFFT 23 converts modulated serial signals into parallel constellations of data for parallel sub-carriers, according to parallel sub-carriers number and timing, performs Inverse Fast Fourier Transform on the parallel constellations per block of FFT size, according to predetermined FFT size and timing. Here, a guard interval may be inserted between every two OFDM symbols to eliminate inter-symbol interference. The guard interval length is determined by transmission path condition, that is, the maximum delay time of delayed waves that affect modulation. Then, the parallel data is converted into serial signals which are in turn transformed into transmit signals on the time axis, while keeping mutual orthogonality of the sub-carriers on the frequency axis.

The transmit signals are then converted into analog baseband signals by the D/A converter 25, the baseband signals are further up-converted into signals in an RF frequency band by the transmit signal analog processing unit 26, and the RF signals are transmitted onto each MIMO channel from the antenna 11.

On the other hand, each reception chain comprises a receive signal analog processing unit 31, an A/D converter 32, a sync acquisition unit 33, FFT 34, a receive weight multiplier 35, a demodulation and decoding unit 36, and the channel characteristics acquisition and adaptive estimation unit 37.

Signals received by the antenna 11 are down-converted from the RF frequency band into baseband signals by the receive signal analog processing unit 31 and the baseband signals are converted into digital signals by the A/D converter 32.

Then, according to synchronization timing detected by the sync acquisition unit 33, the received signals as serial data are converted into constellations of parallel data (one constellation consists of one OFDM symbol including a guard interval). Fast Fourier Transform on signals per effective symbol length is performed by the FFT 34; by extracting each sub-carrier signal, the signals on the time axis are transformed into those on the frequency axis.

The channel characteristics acquisition and adaptive estimation unit 37 first acquires a channel matrix H, using a reference signal whose sub-carriers for multiplexed transmission were weighted discretely per sub-carrier at the other end. By singular value decomposition of the channel matrix H the channel matrix is decomposed into a transmit weight matrix V, receive weight matrix $U^H$, and diagonal matrix D. For reference signals transmitted from the other end at given intervals, the channel characteristics acquisition and adaptive estimation unit 37 updates the channel matrix H, each time a reference signal is received, and executes singular value decomposition of the updated matrix.

For data transmission on the uplink from the receiver to the transmitter, or in the reverse direction, following data transmission on the downlink from the transmitter to the receiver, or in the forward direction, according to the RTS/CTS procedure, the channel characteristics acquisition and adaptive estimation unit 37 obtains transmit weights V' in the reverse direction, based on the result of adaptive estimation of the channel matrix H during user data reception. The procedure for obtaining transmit weights V' in the reverse direction will be described later.

The receive weight matrix $U^H$ derived from the channel matrix through singular value decomposition is set in the receive weight multiplier 35 of the apparatus being discussed and the transmit weight matrix V is fed back to the other end. However, as the receive weight matrix, $D^-U^H$, the inverse matrix of HV may be used instead of $U^H$ (see equation (8) and related description in the foregoing section).

The receive weight multiplier 35 multiplies receive signals by receive weight matrix $U^H$ or $D^-U^H$, obtained by singular value decomposition of the channel matrix H, which spatially demultiplexes the spatially multiplexed receive signals.

Furthermore, the demodulation and decoding unit 36 demaps the thus weighted receive signals from the signal space by a predetermined scheme such as BPSK, QPSK, and 16 QAM, carries out error correction on the signals, and decodes them into receive data which is in turn passed to the upper layer of the communication protocol.

For data transmission on the uplink from the receiver to the transmitter, or in the reverse direction, following data transmission on the downlink from the transmitter to the receiver, or in the forward direction, according to the RTS/CTS procedure, the receiver must obtain transmit weights V' in the reverse direction.

In a wireless communication system relevant to the present embodiment, the transmitter transmits a reference signal for channel matrix acquisition at the receiver and user data following the reference signal. On the other hand, the receiver acquires a channel matrix based on the reference signal attached preceding the user data, receives the user data while weighting the data with receive weights derived from the channel matrix, adaptively estimates the channel matrix H as long as the user data is being received, and obtains transmit weights V' for transmitting user data on the uplink, or in the reverse direction, from an adaptively estimated channel matrix H'. Consequently, it becomes unnecessary to transmit an extra reference signal following the user data to be transmitted from the transmitter to the receiver.

FIG. 2 schematically depicts the functional structure of the channel characteristics acquisition and adaptive estimation unit 37. As shown, the channel characteristics acquisition and adaptive estimation unit 37 is comprised of a channel matrix acquisition unit which acquires a channel matrix in the forward direction from the transmitting end, a channel matrix adaptive estimation unit which adaptively estimates the channel matrix H during the reception of user data transmitted in the forward direction from the transmitting end, and a reverse transmit weight determination unit which determines transmit weights for transmitting user data in the reverse direction to the transmitting end, based on the adaptively estimated channel matrix. The channel matrix adaptive estimation unit adaptively estimates the channel matrix, based on difference between received data and signal points in signal space, as error information, and using an algorithm such as LMS and RLS.

The transmitting end obtains transmit weights V for transmitting user data in the forward direction to the receiver beforehand, and after transmitting a reference signal weighted by V, transmits the user data weighted by V over spatially multiplexed channels. Thus, the channel matrix acquisition unit derives HV as a channel matrix from the reference signal weighted by V and the channel matrix adaptive estimation unit continues to perform adaptive estimation of HV' as a channel matrix during the reception of the user data transmitted in the forward direction from the transmitting end. When user data is transmitted in the reverse direction, following the reception of user data in the forward direction, the reverse transmit weight determination unit can determine the weights V' for transmitting the data in the reverse as follows: it obtains H' by multiplying H'V by $V^H$ and executes singular value decomposition of the transposed matrix of H'.

In the following, the procedure for bidirectional MIMO communication of RTS, CTS, DATA (downlink), and DATA (uplink) in the wireless communication system relevant to the present embodiment will be described with reference to FIG. 3. At the transmitter, processing for obtaining a transmit weight matrix V is assumed finished beforehand.

(Step 1)

An RTS packet is transmitted from the transmitter to the receiver. At this time, the transmitter transmits a reference signal preceding the RTS packet to the receiver. From this reference signal, the receiver can derive a channel matrix H(Dn) in the forward direction, or on the downlink.

(Step 2)

At the receiver, matrix U(Dn) and matrix V(Dn) are obtained by singular value decomposition of the channel matrix H(Dn).

(Step 3)

The receiver transmits a CTS packet in response to the RTS packet. At this time, the receiver transmits a reference signal preceding the CTS packet.

(Step 4)

At the transmitter, a channel matrix H(Up) in the reverse direction, or on the uplink, is derived from the reference signal attached to the CTS packet. The uplink channel matrix is the transposed matrix of the downlink channel matrix; that is, $H(Up)=H(Dn)^T$ (see equation (9)). Then, at the transmitter, the weights V(Dn) for transmitting data on the downlink can be obtained by singular value decomposition of H(Up).

(Step 5)

The transmitter transmits downlink data to the receiver. As the downlink data, user data weighted by V(Dn) is transmitted, following a reference signal weighted by V(Dn).

(Step 6)

The receiver can derive H(Dn)V(Dn) from the reference signal attached to the downlink data. The receiver receives the downlink data, using the inverse matrix of H(Dn)V(Dn) as receive weights (see equation (8)).

(Step 7)

While receiving the downlink data, the receiver adaptively estimates H(Dn)V(Dn), using an LMS algorithm, thus executing calculation to follow channel condition change.

Channel condition change can be followed by executing the following LMS algorithm, where e is an error signal for errors in correspondence between the received data and signal points in signal constellation, X is a transmit signal estimated by decoding the received data, and W is an estimate value of H(Dn)V(Dn).

$$W(m+1)=W(m)+\mu X(m)e \quad (11)$$

(Step 8)

At the receiver, a most recent downlink channel matrix H(Dn, new) is obtained by multiplying the estimate value of H(Dn)V(Dn), adaptively estimated through the LMS algorithm, by $V(Dn)^H$.

(Step 9)

At the receiver, furthermore, U(Dn, new) is obtained by singular value decomposition of the obtained channel matrix H(Dn, new).

(Step 10)

The receiver transmits uplink data to the transmitter. As the uplink data, user data weighted by U(Dn)* is transmitted, following a reference signal weighted by U(Dn)* (see equation (10)).

(Step 11)

The transmitter derives a channel matrix from the reference signal attached to the uplink data. The transmitter calculates the inverse matrix of the derived channel matrix, and using this inverse matrix as receive weights, receives the uplink user data while weighting the data with the receive weights.

Although having described in detail the present invention with reference to its specific embodiment, it will now be apparent to those skilled in the art that modifications and alterations can be made therein without departing from the scope of the gist of the invention.

The present invention can be applied to various types of wireless communication systems that perform data transmission by way of spatial multiplexing and the scope of its application is not limited to space division, or to be exact, spatially orthogonal multiplexing transmission schemes like the SVD-MIMO scheme. The present invention can suitably be applied to other types of communication systems where either the transmitting or receiving end carries out special multiplexing and weighted transmission/reception is performed, based on channel matrix factorization.

In other words, a preferred embodiment of the present invention has been disclosed for illustrative purposes and the description in this specification should not be construed to limit the present invention. In interpreting the gist of the invention, appended claims should be referenced and taken into consideration.

What is claimed is:

1. A wireless communication system which carries out data transmission, using multiple spatially multiplexed communication channels between a transmitter and a receiver, comprising:

the transmitter configured to transmit user data following a reference signal for channel matrix acquisition, wherein said transmitter obtains transmit weights V for transmitting the user data in a forward direction to said receiver beforehand, weights the reference signal and the user data by V, and transmits the user data following the reference signal over the spatially multiplexed communication channels;

the receiver configured to acquire a channel matrix H, based on the reference signal attached preceding the user data, receive the user data, while weighting the user data with receive weights U derived from the channel matrix H, and adaptively estimate the channel matrix H as long as the user data is being received; and a channel characteristics acquisition and adaptive estimation unit HV as a channel matrix from the reference signal weighted by V and continues to perform adaptive estimation of HV' as a channel matrix during the reception of the user data transmitted in the forward direction from said transmitter, and, when transmitting the user data in a reverse direction, following the reception of the user data, predetermines weights V' for data transmission in the reverse direction by obtaining a transposed matrix of H' by multiplying H'V by $V^H$ and by singular value decomposition of the transposed matrix of H', where $V^H$ corresponds to a matrix of antenna weighting factors at the transmitter.

2. The wireless communication system according to claim 1, wherein both said transmitter and said receiver are equipped with multiple antennas, said transmitter allocates transmit data to multiple streams, weights the streams, and transmits the weighted streams from the transmit antennas, and said receiver weights the streams received by the receive antennas.

3. A wireless communication apparatus which receives data transmitted from a transmitting end, using multiple spatially multiplexed communication channels, said wireless communication apparatus comprising:

a receiving section which receives user data and a reference signal weighted by transmit weights V transmitted in a forward direction from said transmitting end;

a channel matrix acquisition unit which acquires a channel matrix H in the forward direction from said transmitting end and derives HV as a channel matrix from the reference signal weighted by the transmit weights V;

said receiving section configured to weight the user data with receive weights U derived from the acquired channel matrix H;

a channel matrix adaptive estimation unit which adaptively estimates the channel matrix H during reception of the user data transmitted in the forward direction from said transmitting end and continues to perform adaptive estimation of HV' as a channel matrix during the reception of the user data transmitted in the forward direction from said transmitting end;

a reverse transmit weight determination unit which predetermines weights V' for data transmission in a reverse direction by obtaining a transposed matrix of H' by multiplying H'V by $V^H$ and by singular value decomposition of the transposed matrix of H', where $V^H$ corresponds to a matrix of antenna weighting factors at the transmitter end; and a transmitting section which weights the user data with the thus determined weights V' and transmits the user data in the reverse direction to said transmitting end.

4. A wireless communication method for receiving data transmitted from a transmitting end, using multiple spatially multiplexed communication channels, said wireless communication method comprising the steps of:

obtaining, at said transmitting end, transmit weights V for transmitting user data in a forward direction to a receiving end;

weighting a reference signal and the user data by the transmit weights V;

transmitting the user data following the reference signal over the spatially multiplexed communication channels;

acquiring a channel matrix H in the forward direction from said transmitting end;

deriving HV as a channel matrix from the reference signal weighted by the transmit weights V;

receiving the user data transmitted in the forward direction from said transmitting end and weighting the user data with receive weights U derived from the acquired channel matrix H;

adaptively estimating HV' as a channel matrix during the reception of the user data transmitted in the forward direction from said transmitting end;

determining transmit weights V' for data transmission in a reverse direction by obtaining a transposed matrix of H' by multiplying H'V by $V^H$ and by singular value decomposition of the transposed matrix of H', where $V^H$ corresponds to a matrix of antenna weighting factors at the transmitting end; and weighting the user data with the thus determined weights V' and transmitting the user data in the reverse direction to said transmitting end.

5. A computer readable medium embodying a program of instructions executable by a computer system to perform a method of receiving data transmitted from a transmitting end, using multiple spatially multiplexed communication channels, said method comprises the steps of:

receiving user data and a reference signal weighted by transmit weights V transmitted in a forward direction from said transmitting end;

acquiring a channel matrix H in the forward direction from said transmitting end and deriving HV as a channel matrix from the reference signal weighted by the transmit weights V;

weighting the user data with receive weights U derived from the acquired channel matrix H;

adaptively estimating the channel matrix H during reception of the user data transmitted in the forward direction from said transmitting end and continuing to perform adaptive estimation of HV' as a channel matrix during the reception of the user data transmitted in the forward direction from said transmitting end;

determining weights V' for data transmission in a reverse direction by obtaining a transposed matrix of H' by multiplying H'V by $V^H$ and by singular value decomposition of the transposed matrix of H', where $V^H$ corresponds to a matrix of antenna weighting factors at the transmitting end; and weighting the user data with the thus determined weights V' and transmitting the user data in the reverse direction to said transmitting end.

* * * * *